MAGNETIC TAPE CAPSTAN SYSTEM

Filed June 2, 1964

2 Sheets-Sheet 1

INVENTOR
Wallace B. Edwards, Jr.

BY Joseph A. Genovese

ATTORNEY

Forward

Stopping

Hold

Reverse

INVENTOR
Wallace B. Edwards, Jr.

BY Joseph A. Genovese
ATTORNEY

United States Patent Office 3,268,139
Patented August 23, 1966

3,268,139
MAGNETIC TAPE CAPSTAN SYSTEM

Wallace B. Edwards, Jr., Minneapolis, Minn., assignor to Control Data Corporation, Rockville, Md., a corporation of Minnesota Filed June 2, 1964, Ser. No. 372,016
18 Claims. (Cl. 226—7)

This invention relates to tape transports and particularly to high speed, high performance magnetic tape transports suitable for data processing applications.

At this stage in the development of the art the desirability of instantly stopping the tape and instantly accelerating the tape to full speed are well known. If these ideals could be achieved, repeatability would be perfect and inter-block spacing of magnetic tape could be eliminated. With the capability of stopping and starting on a single bit or character, searching, editing, etc. would be greatly facilitated. However, one of the main advantages is the elimination of many of the unit-to-unit compatibility difficulties growing out of poor repeatability of prior tape transports. Unfortunately, the ideal instant stop and instant acceleration cannot be achieved by direct means because the accelerations and decelerations would be infinite. Obviously, such accelerations and decelerations are not possible.

It is interesting that others have tried to achieve the effect of instant stopping and instant starting to full tape speed without encountering the obviously unachievable infinite accelerations and decelerations. For example, U.S. Patent No. 2,904,777, uses a separate channel on the tape together with a logic circuit network which causes the tape to move back when it overshoots after a stop command is given, and to provide a "running start" when accelerating from a stopped position. Such a system does overcome excessive inter-word or inter-block spacing on the tape, but it is slow owing to the additional stopping and starting that is required. Also, the above method system requires an additional tape channel which may not always be available in magnetic tape systems.

The present invention does not endeavor to achieve the ideal instant stop and instant start in a magnetic tape transport. Instead, the invention makes it possible to approach these ideals more closely than has heretofore been possible, and very important, the repeatability of time and tape-distance required to stop the tape is excellent. Very briefly, this is achieved by utilizing a dynamic brake in a unique manner to provide at least the major portion of the braking force necessary to stop the tape in response to a command signal, as described more fully below.

Numerous types of magnetic tape transports have been developed, however, the more successful transports use capstans to drive the tape. There are mechanical and pneumatic capstans. Mechanical capstans generally consist of a rotating capstan wheel and a pinch roller. These are not as favorably considered as the pneumatic capstans because the oxide surface of the magnetic tape is often damaged by the pinch rollers, and skew problems are somewhat severe. Pneumatic capstans have been well known for many years, and these seem to be more satisfactory for magnetic tape use. For instance, a capstan like the one disclosed in U.S. Patent No. 1,655,688 is excellent for driving magnetic tape. A capstan like the one disclosed in the Belgian Patent No. 517,967 is also excellent, particularly when used in pairs in a manner such that the driving capstan of a pair holds the tape on the surface of the capstan by a vacuum, while the non-driving capstan of the pair pneumatically repels the tape from its surface.

An undesirable feature of any of the capstan-type tape transports arises from the impossibility of stopping and starting the tape "instantly" in response to command signals. Static brakes which are continuously applied, for instance, as disclosed in Swiss Patent No. 165,510 or German Patent No. 601,816, or intermittently applied as in the Belgian Patent No. 517,967 do not satisfactorily fulfill the need for rapid stops. In other words, static pneumatic brakes whether continuously applied or intermittently applied will not bring the tape to rest quickly nor smoothly enough.

This invention enables the tape to be stopped more quickly than has heretofore been possible without breaking the tape. When embodied in a tape transport using a pair of contra-rotating pneumatic capstans, this invention functions in the following way: when the tape is being driven in one direction (e.g. forward), the tape is suction-adhered to the driving capstan, and pressure-repelled from the other capstan to form an air cushion between the tape and non-driving capstan. When a stop command signal is given, pressure is applied to the forward-driving capstan and at the same time suction is applied to the non-driving capstan for a brief period of time, for example, for one to two milliseconds. With the tape moving forward by inertia and the non-driving capstan rotating in a direction opposite to the motion of the tape, as the tape becomes suction-attracted to the non-driving capstan, the capstan functions as a dynamic brake. This dynamic braking action can be responsible for all or a portion of the brake effort on the tape. In other words, the utilization of a pneumatic capstan as a dynamic brake for a brief period, can be used in combination with a continuously applied pneumatic clamp (often referred to as a drag device or brake) and/or a static pneumatic brake. When static brakes are used, they (or it) are preferably, but not necessarily, rendered operative after the capstan-dynamic brake action has taken place.

Accordingly, an object of this invention is to provide a unique braking system for a capstan type magnetic tape transport.

There is a great advantage in using a dynamic brake as opposed to a static brake. Static brakes stop the tape suddenly by clutching the tape to a fixed surface. Whereas my dynamic brake applies a smooth friction force to the tape owing to the slippage between the tape and capstan. The tape stopping force is smoothly applied even until the tape is decelerated to zero velocity, and this allows braking action to be very fast and precise. Precision of stopping (requiring identical time and identical tape travel distance for each stop) is urgently important in having unit-to-unit compatibility.

Another object of the invention is to provide a plural-capstan tape transport with means by which to convert one of the capstans to a dynamic brake for a brief period of time upon receipt of a control signal, thereby increasing performance of the tape transport beyond that which can be accomplished with prior types of pneumatic brakes.

A further object of the invention is to provide a plural purpose pneumatic capstan which not only drives the tape and/or holds the tape separate from its surface, but also provides dynamic braking for the tape.

A feature of the invention is the utilization of mechanical parts that are already necessary and available in tape transports. The vacuum and pressure valves are required for the capstans, and these valves and the capstans require only a minor logic control to exercise the additional braking functions which characterize the invention.

Other objects and features of importance will become apparent in following the description of the illustrated form of the invention which is given by way of example only.

FIGURE 1 is a largely schematic view of a pneumatic capstan type magnetic tape transport incorporating the principles of the present invention.

FIGURES 1*a*–1*d* inclusive are schematic functional views showing the operation of the invention.

Figure 1:
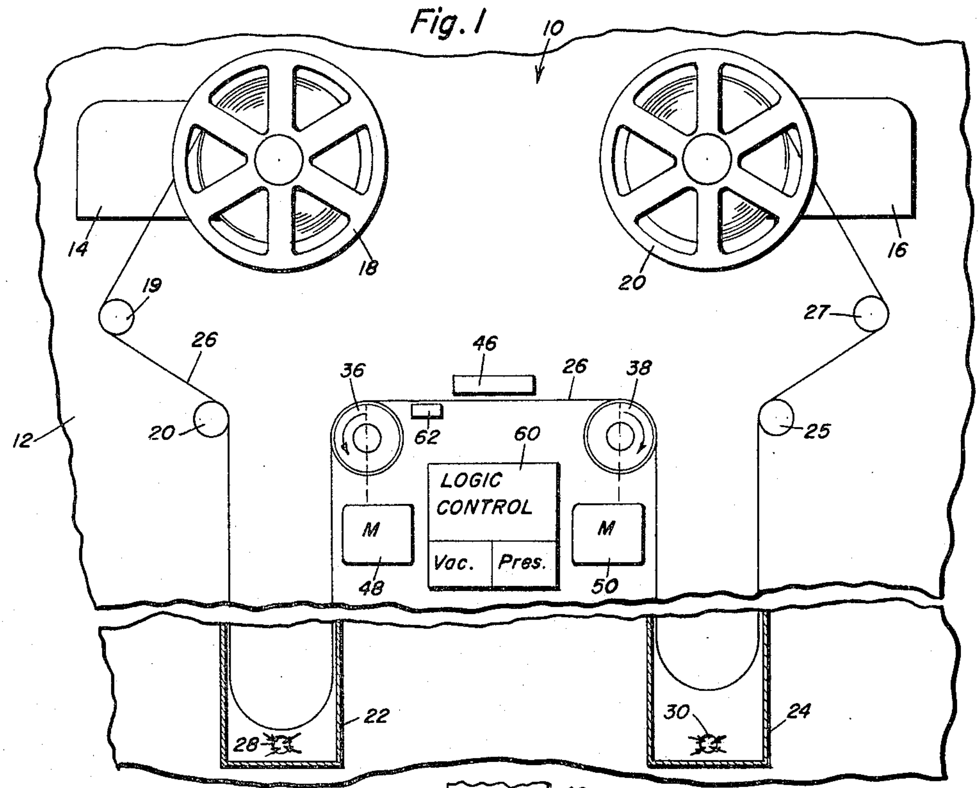
Figure 2:
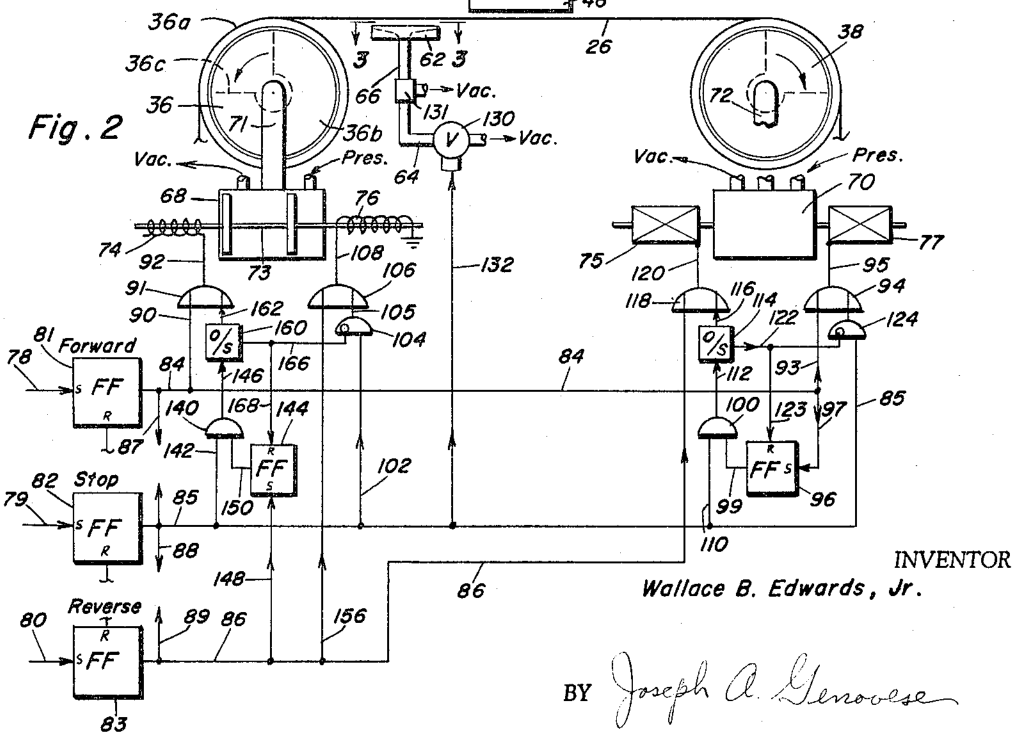
FIGURE 2 is a diagrammatic view showing the tape motion control circuits together with the pneumatic systems with which they are associated in the tape transport.
Figure 1A:
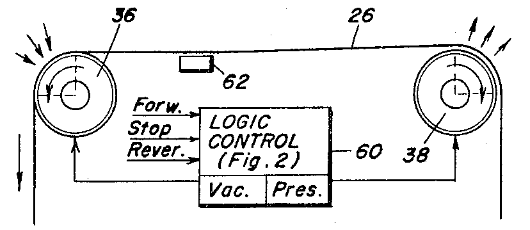
Figure 1B:
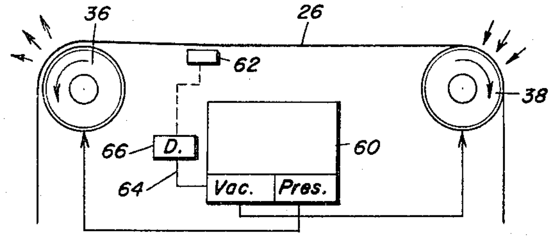
Figure 1C:
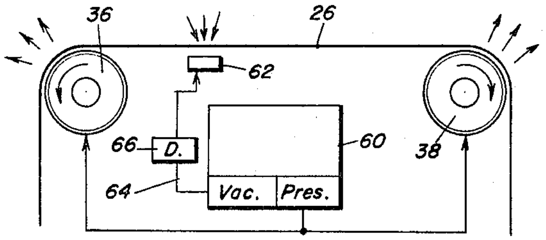
Figure 1D:
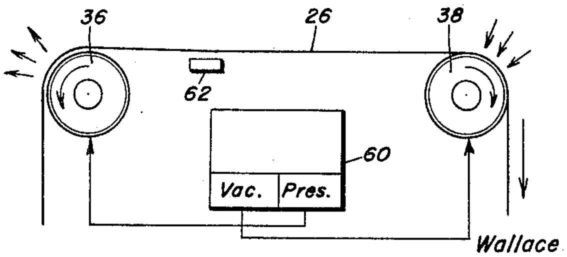

FIGURE 1 is a diagrammatic illustration of a magnetic tape transport whose design and construction is conventional except for the previously described unique features shown functionally in FIGURES 1–1*d* and in detail in FIGURE 2. Tape transport 10 has a main frame 12 supporting motors 14 and 16 which are used to drive the left and right magnetic tape reels 18 and 20 in selected clockwise or counterclockwise directions. From reel 18 tape 26 extends around idlers 19 and 20 and into loop chamber 22. From chamber 22 the tape extends over left and right capstans 36 and 38, and into loop chamber 24 whence the tape is guided by idlers 25 and 27 to reel 20. The pneumatic loop chambers 22 and 24 for the left and right loops of magnetic tape 26 have their lower ends exposed to a suction source, for example by ports 28 and 30, in order to maintain the magnetic tape loops under tension. The loop-sensing devices and circuits normally associated with magnetic tape loop chambers are not shown. If desired, one of the left idler rollers and one of the right idler rollers can be operatively connected with tachometers to provide a velocity servo correction for the operation of the tape reels.

Read, write and erase head assembly 46 is located between capstans 36 and 38. The head assembly is conventional and is located in a manner to confront the oxide side of the tape 26. The capstans 36 and 38 engage the Mylar side of the tape. Each capstan is driven by its motor 48 or 50, and can be constructed similar to the capstan disclosed in Belgian Patent No. 517,967. As in that patent, a flanged rotor is actuated by a motor, for instance motor 48 (FIGURE 1) for capstan 36. As shown in FIGURE 2, capstan 36 has flange **36*a*, and there is a stationary distributor block 36*b* with a commutating sector or segment 36*c* which commutates the openings in flange 36*a*** with a pneumatic source (suction or vacuum) as described below.

Figure 3:
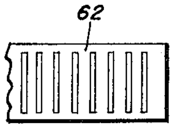
FIGURE 3 is an enlarged view taken on the line 3—3 of FIGURE 2.

Starting with FIGURE 1*a*, assume that the magnetic tape is being driven "forward" (in the direction of the arrow). To require the tape to move in this direction, capstan 36 is connected with a vacuum source, i.e. it is pneumatically energized in a manner such as to cooperate with the atmospheric pressure to bring a surface of the tape against the pneumatically commutated sector of the capstan 36. The logic control 60 (described later) is responsible for this and the other switching functions to be described. At the same time that capstan 36 is vacuum-energized, the capstan 38 is connected with a pressure source by logic control 60 so that the commutated section of capstan 38 conducts air under pressure through apertures in the surface of the capstan to keep the adjacent, confronting part of the tape slightly separated from the capstan surface. In other words, an air bearing or cushion is formed between the tape and the surface of capstan 38 during the forward mode of operation of the tape transport. Pneumatic clamp 62 is located between capstans 36 and 38 and the apertured surface thereof (FIGURE 3) confronts the Mylar side of tape 26. As mentioned before and as will be described in more detail later, pneumatic clamp 62 can be used in a number of ways.

Assume that while the tape is moving forward (FIGURE 1*a*) a control signal is given to the logic control 60, commanding the tape to stop. As shown in FIGURE 1*b*, the logic control connects the pressure source with the capstan 36, and the vacuum source to the capstan 38. At the same time the vacuum source begins to be connected with pneumatic clamp 62 by way of conduit 64. A pneumatic delay which is schematically represented at 66, is interposed in conduit 64 so that the initial stopping of the tape is accomplished by dynamic braking action between the tape and the non-driving capstan 38 owing to the suction which is applied to capstan 38. At the instant that the suction is applied to capstan 38 (FIGURE 1*b*) tape 26 will be moving to the left while the confronting surface of capstan 38 is moving to the right so that there is a sliding frictional contact between the Mylar side of the tape and the capstan 38 which is now functioning as a dynamic brake. Owing to the slippage between the tape and the capstan 38, the braking action is smooth and gradual although very fast. In fact, the braking action is smooth even if dynamically applied until the tape comes to a complete stop. This is a far more satisfactory method of stopping the tape than, for example, a static friction brake of the pneumatic or mechanical type owing to the inherent tape flutter and jerk which the latter type of brakes cause when suddenly applied to the tape.

After a brief interval, for example of the order of a millisecond (FIGURE 1*c*), the logic control 60 discontinues the vacuum to capstan 38 and connects capstan 38 to a pressure source so that the tape is lifted from the surface of the rotating capstan 38. By this time the pneumatic delay 66 will have expired and the pneumatic clamp 62 will hold the tape to keep it from fluttering. In practice, it is desirable to have the dynamic brake exert the major portion of the braking action on the tape, while the pneumatic clamp 62 becomes effective thereafter.

FIGURE 1*d* shows the operation of the tape transport in driving the tape in the reverse direction. To drive the tape to the right as shown in FIGURE 1*d* (reverse direction), the logic control 60 connects capstan 36 to the pressure source, while connecting capstan 38 to the vacuum source. Accordingly, an air cushion is formed between the tape and the surface of capstan 36, and another portion of the tape is pneumatically engaged with the surface of capstan 38. Owing to the direction of rotation of capstan 38, tape 26 is propelled in the reverse direction. When the tape is operating in this direction and stop command signal is given (or a forward command signal which cycles through the stop procedure and then into the forward mode) the action is the same as depicted in FIGURE 1*b* except capstan 36 is suction-energized for a brief period causing capstan 36 to act as a dynamic brake, while pressure is applied to capstan 38.

Attention is now directed to FIGURE 2 showing a functional representation of the logic control circuits which control tape motion in response to command signals, for example "forward," "stop," and "reverse" commands. It is understood that the logic circuitry, the type of valves, the pressure and vacuum sources, and the like, are given by way of example only, and that wide variation is possible in structural implementation of this part of the invention.

With the above in mind, each capstan is provided with its vacuum and pressure control valve 68 and 70 respectively, with the respective valves operatively connected to the ports of the capstans by means of conduits 71 and 72. The valve elements 73 of valve 68 is movable between the illustrated position (to the left) and the opposite position (to the right). When in the position shown, capstan 36 is connected with a vacuum source via valve 68, and when valve element 73 is moved to the right, the capstan 36 is connected to the pressure source. Electromagnetic valve actuators 74 and 76 connected to the valve element 73 move the valve element 73 between the two operative positions. It is understood that valve 70 with its actuators 75 and 77 service capstan 38, and are otherwise identical to the corresponding valve 68 and its actuators 74 and 76.

As described before, capstans 36 and 38 are rotated continuously in opposite directions by their motors 48 and 50 (FIGURE 1). Tape 26 is driven in a forward direction or in the reverse direction, or stopped by the pneumatic energization (by pressure or vacuum) of selected capstans 36 and 38. Control signals ordering the various possible tape motions can originate from any source. Therefore, three signal conductors 78, 79 and 80 are shown in FIGURE 2, and it is assumed that the respective conductors are for "forward," "stop" and "reverse" signals, and forward, stop and reverse flip-flops 81, 82 and 83 are set by the signals on their respective input lines 78, 79 and 80. The output lines 84, 85 and 86 of the flip-flops 81–83 have flip-flop reset lines 87, 88 and 89 connected thereto and so connected with the reset terminals of the flip-flops that when a signal is received by any one of the flip-flops, the output of that flip-flop resets the two other flip-flops (if needed).

As a starting point, assume that the tape transport is operating in the forward tape-driving mode (FIGURE 1*a*). This presupposes a signal on line 78 which sets flip-flop 81 thereby providing an output on line 84 which is fed back over reset line 87 to reset flip-flops 82 and 83, if they were in a set condition.

The signal on line 84 is conducted to the electromagnetic actuator 74 by way of line 90, OR gate 91 and line 92. Thus, valve 68 has its element 73 actuated to the position shown thereby connecting the pneumatic passage system of capstan 36 to the vacuum source to attract the tape to the surface of capstan 36 (FIGURE 1*a*). As shown to the right of FIGURE 2, line 84 conducts its signal over line 93, through OR gate 94 and over line 95 to electromagnetic actuator 77 to actuate valve 70 to the position at which the pressure source is communicated with the pneumatic passages of capstan 38. Thus, capstan 38 is pressure energized (FIGURE 1*a*) concurrently with the suction energization of capstan 36. The forward signal on line 84 also sets a forward memory flip-flop 96 via line 97 which is connected to line 84. The output signal of flip-flop 96 is conducted on line 99 to form one input of a two-entry AND gate 100.

Now assume that a stop command signal is conducted on line 79. The stop flip-flop 82 will be set thereby providing an output signal on line 85 which is fed back over line 88 to reset flip-flop 81, but it is understood, of course, that if the reverse flip-flop 83 has been set, it would have been reset. The stop signal on line 85 is conducted to actuator 76 by way of line 102 secured to line 85, and inhibit gate 104 whose output on line 105 is passed by OR gate 106 to be conducted on line 108 to actuator 76. Actuator 74 of valve 68 became de-energized at the instant that the signal on the forward flip-flop 84 was discontinued. Thus, with the energization of actuator 76, capstan 36 is connected with the pressure source shown schematically in FIGURE 1*b*.

The stop command signal is also conducted from line 85 to the AND gate 100 by way of line 100. Since the only other input of gate 100 is satisfied by the output of forward flip-flop 96, gate 100 passes a signal over line 112 to the one shot multivibrator 114 whose output on line 116 passes OR gate 118 and is conducted on line 120 to the valve actuator 75. This actuates valves 70 to a position such that capstan 38 is exposed to the vacuum source for the period of the one shot multivibrator output, which can be precisely adjusted so that the vacuum is applied to capstan 38 for a precise predetermined interval, for example from one to two milliseconds.

The output signal from multivibrator 114 is also conducted on line 122 to the inhibit terminal of inhibit gate 124 whose other input is on line 85. Accordingly, during the period of the one shot multivibrator 114, the stop signal on line 85 cannot pass gate 124. But, as soon as the one shot multivibrator output signal discontinues, the inhibit signal is removed from gate 124, allowing the stop signal on line 85 to pass gate 124 and be conducted by OR gate 94 and line 95 to actuator 77. This suddenly actuates valve 70 to a position at which capstan 38 is communicated with the pressure source (FIGURE 1*c*). Since the forward flip-flop 96 has served its purpose, i.e. remembering that the tape transport was driving the tape forward at the time of the stop signal, flip-flop 96 is reset by the one shot multivibrator output signal on line 122 which is conducted to the reset terminal of flip-flop 96 by way of line 123.

The stopping and holding procedure (FIGURES 1*d* and 1*c*) have been described, except for pneumatic clamp 62. The pneumatic clamp consists of a manifold having a plurality of ports (FIGURE 3) confronting the Mylar side of the tape. The pneumatic clamp can be used in a number of capacities. For instance as shown in FIGURE 2, pneumatic conduit 64 extends from the pneumatic manifold to valve 130. The valve is connected to a high vacuum source under the control of valve 130, however, fitting 131 is interposed in conduit 64 between valve 130 and the air manifold. The fitting is assumed to be connected to a low vacuum source. Thus, when valve 130 is closed, the pneumatic clamp 62 applies a drag on the tape 26 owing to the connection with the low vacuum source. When the stop signal is conducted on line 85, it is fed over line 132 to the valve 130 thereby opening the valve in the sense that it connects conduit 64 to the high vacuum source. Although the valve 130 is actuated immediately upon receipt of the stop signal on line 85, FIGURES 1*b* and 1*d* show delay 66 which is a pneumatic delay formed by the length of pneumatic conduit 64 and/or a throttle valve (not shown). The reason for this is that the stopping of the tape can be accomplished considerably more effectively, predictably and promptly by using one of the capstans for the major portion of the braking action. For a static brake to be equivalent in effectiveness to a capstan used as a dynamic brake, it would be very large. Since it is highly desirable to have the tape distance between capstans maintained at a minimum owing to the stretch, skew, and other problems peculiar to magnetic tape transports, a static brake of equivalent effectiveness does not seem possible. Most important is that dynamic braking is smooth, i.e. the tape is not subjected to jerks and deceleration peaks, even when decelerating to zero velocity. The same is not true of static braking. Thus, pneumatic clamp 62 is designed as a mere supplement to the major braking effort. The clamp 62 helps to overcome collateral problems such as tape skew and flutter which are minimized if not completely obviated by the pneumatic clamp.

At the time of the stop signal on line 85, it will be noted that AND gate 140 is interrogated by the stop signal which is fed to gate 140 via line 142. However, since the reverse flip-flop 144 was not set at the time of the stop signal, gate 140 will not conduct a signal over its output line 146. Accordingly, when the tape has come to rest, it is held or clamped by clamp 62 in a rest position (FIGURE 1*c*), and the portions of the tape confronting the two capstans 36 and 38 are supported on air cushions so that there is no tape-wear nor measurable friction to contend with.

Let us now assume that the tape is in the hold position (FIGURE 1*c*) and a reverse command signal on line 80 is received. This signal is conducted from flip-flop 83 over lines 86 and 89 to reset the stop flip-flop 82. In addition, the reverse signal on line 86 is conducted over line 148 to the set terminal of the reverse memory flip-flop 144. Thus, there is an output from flip-flop 144 over line 150 to AND gate 140. However, this output will not pass gate 140 because the stop signal on line 85 (and hence line 142) has been discontinued.

The reverse signal on line 86 is conducted over line 156 to actuator 76 of valve 68 by way of line 156, OR gate 106 and line 108. Although valve 68 is already in the correct position, i.e. connecting the pressure source to capstan 36, the new holding signal is provided.

The reverse signal on line 86 passes OR gate 118 and is conducted on line 120 to actuator 75 of valve 70. This actuates the valve to the position that connects capstan 38 to the vacuum source so that the capstan 38 draws the tape against its surface.

Should a stop signal now be given, the same stopping procedure will result as described before except capstan 36 will act as a dynamic brake for a predetermined interval, instead of capstan 38 functioning in this way as shown in FIGURE 1*b*. This happens in the following way: When the stop signal is conducted on line 85, it is conducted to gate 100 via line 110, but fails to pass that gate because the forward flip-flop 96 will not be set at this time. On the other hand, the reverse flip-flop 144 will have been set so that the stop signal conducted on lines 85 and 142 will pass AND gate 140. The output of gate 140 is conducted on line 146 and triggers the one shot multivibrator 160 whose output on line 162 is conducted through OR gate 91 and over line 92 to actuator 74 of valve 68. Since actuator 74 is energized for the period of the multivibrator output, capstan 36 is suction-energized for that period of time.

The output signal of the one shot multivibrator 160 is also conducted on line 166 to the inhibit terminal of gate 104 which corresponds to the previously described gate 124. Thus, during the period of the one shot multivibrator, the stop signal conducted on lines 85 and 102 cannot pass gate 104, but the stop signal can pass the gate 104 when the one shot multivibrator output has expired. Line 168 connected to line 166 and to the reset terminal of the flip-flop 144 is used to reset that flip-flop.

It is, of course, understood that if the tape is moving in one direction, for example forward, and reverse signal is received, the tape transport will cycle through the stop procedure and then enter the reverse procedure, and this is accomplished by simple conventional means, e.g. relay of flip-flop interlocking as well known in many arts.

It is understood that embodiments shown and/or described herein are given by way of example only. Many variations, modifications and other deviations may be made without departing from the protection of the following claims.

What is claimed is:

1. In a tape transport, a first and second pneumatic capstan which rotate in opposite directions, pneumatic means including valve means to apply suction to the first capstan and pressure to the second capstan to thereby drive the tape in one direction by its engagement with the first capstan and pneumatic separation from the second capstan; an improvement in the stopping of the tape comprising means for discontinuing the suction to said first capstan and for applying pressure thereto to separate the tape from its driven connection therewith, and substantially simultaneously operated control means to condition said valve means for engaging the tape with the second capstan for a duration sufficient to at least appreciably decelerate the tape owing to the direction of rotation of said second capstan and the direction of tape motion.

2. In a flexible tape transport, a first and second pneumatic capstan which rotate in opposite directions with respect to each other, pneumatic means including valve means to apply suction to the first capstan and pressure to the second capstan to thereby drive the tape in one direction by its engagement with the first capstan and pneumatic separation from the second capstan; the improvement comprising means for discontinuing the suction to said first capstan and for applying pressure thereto to separate the tape from its driven connection therewith, substantially simultaneously operated control means to condition said valve means to apply a suction to the second capstan thereby engaging the tape with the second capstan for a predetermined duration sufficient to decelerate the tape owing to the direction of rotation of said second capstan after which said engaging means are released, and holding means effective to hold the tape after tape deceleration by said second capstan.

3. In a flexible tape transport provided with a pair of capstans, and a valve controlled pneumatic system, each capstan adapted to be energized with pressure and vacuum by said system to respectively engage and disengage the tape from the capstans, one capstan being rotated continuously in one direction and the other capstan being continuously rotated in the opposite direction, means utilizing one of said capstans to improve the safe stopping time for the tape while the tape is moving in one direction and it is desired to bring the tape to rest, the last-mentioned means including control means to condition a pneumatic valve associated with the non-driving capstan of the pair to apply a vacuum for a predetermined period thereby utilizing the non-driving capstan as a dynamic brake for the tape.

4. In a flexible tape transport provided with a pair of capstans, pneumatic valve means, each capstan adapted to be energized with pressure and vacuum under the control of said valve means to respectively disengage and engage the tape with the capstans, one capstan being rotated continuously in one direction and the other capstan being continuously rotated in the opposite direction, means utilizing one of said capstans to improve the safe stopping time for the tape while the tape is moving in one direction and it is desired to bring the tape to rest, the last-mentioned means including control means to condition the valve means associated with the non-driving capstan to apply a vacuum thereby utilizing the last-mentioned capstan as a dynamic brake for the tape, means stationary with respect to the tape motion to clamp the tape, and means to actuate said clamp means.

5. In a magnetic tape transport having a first and a second capstan which contra-rotate, means to pneumatically energize said capstans in a manner such that the tape is attracted to said first capstan and repelled from the second capstan thereby driving the tape in one direction, and means to stop said tape, said stop means including means for de-energizing said first capstan, and control means for conditioning said energizing means to pneumatically engage the tape with the second capstan for a predetermined interval so that the rotating second capstan functions as a dynamic brake for the tape, and said control means thereafter conditioning said energizing means to cause the tape to be pneumatically separated from said second capstan.

6. The magnetic tape transport of claim 5 and a pneumatic clamp to engage said tape, and means effective at least after said tape has been dynamically braked by said second capstan for clamping the tape.

7. In a tape transport, a pair of contra-rotating pneumatic capstans, means for applying suction to one capstan and pressure to the other so as to drive the tape in one direction, and control means responsive to a control signal for discontinuing the suction to said one capstan so that it releases the tape and for applying suction to the other capstan whose periphery is moving in the direction opposite to the tape where it confronts the tape so that said other capstan attracts and dynamically brakes the tape.

8. In a magnetic tape transport, the combination of a pair of contra-rotating capstans, each capstan provided with means to selectively admit suction and pressure so that the tape can be selectively attracted or repelled from the surfaces of the pair of capstans, and logic control means associated with said suction and pressure admitting means for converting a selected capstan to a dynamic brake for a predetermined period when the tape transport is commanded to change modes of tape actuation.

9. The subject matter of claim 8 and means for exercising a clamping function on the tape adjacent to one of said capstans.

10. The subject matter of claim 9 wherein said clamp function exercising means include a suction device, and means effective in association with the dynamic brake functioning of said capstan for at least modifying the effectiveness of said clamping means.

11. In a system for transporting a flexible tape in a select direction and for stopping the tape by means of contra-rotating capstans, the steps of driving the tape by engaging the tape with a first of the capstans, and disengaging the tape from a second of the capstans, and stopping the tape by disengaging the tape from said first capstan, and engaging the tape with said second capstan for a predetermined duration thereby dynamically braking and decelerating the tape owing to the direction of rotation of said second capstan which at the instant of engagement with said tape is opposite to the direction of tape motion.

12. The subject matter of claim 11 and the additional steps of disengaging the tape from said second capstan, and holding the tape after deceleration by said second capstan.

13. The system of driving and stopping a flexible tape by a pair of contra-rotating pneumatic capstans, said system comprising the steps of suction energizing a first of the capstans and thereby engaging a portion of the flexible tape with said first capstan to drive the tape in one direction, pressure energizing the second capstan substantially simultaneously with the energization of said first capstan thereby separating another portion of the tape from the second capstan, and stopping the tape by the steps of de-energizing the first capstan thereby releasing the tape from its driven connection with said first capstan, de-energizing the pressure actuation of said second capstan, and suction-energizing the second capstan to engage the tape with the second capstan while the tape is moving in a direction opposite to the confronting surface of the second capstan thereby dynamically braking the tape owing to the rotation and direction of the second capstan and its pneumatic engagement with the tape and the direction of motion of the tape at the instant of engagement with the second capstan.

14. The subject matter of claim 13 and the additional step of discontinuing the suction energization of the second capstan after a dynamic braking period, and clamping the tape in order to hold the tape in a static position.

15. The system of driving and stopping a flexible tape by an apparatus having a pair of continually operating contra-rotating capstans; said system involving the steps of engaging the tape with a first of said capstans to drive the tape in a first direction; and to stop said tape, the steps of disengaging the tape from its driven engagement with said first capstan; and for a brief period engaging the tape with the second capstan to thereby dynamically brake the motion of the tape.

16. The system of driving and stopping a flexible magnetic tape having a recording surface and a back surface, by the use of an apparatus having a first and a second contra-rotating pneumatic capstan which continuously rotate, and means for selectively energizing said capstans with suction to drivingly engage the tape therewith; said system involving the steps of engaging the back surface of a portion of the tape with the first capstan by suction energization thereof thereby driving the tape in a first direction; and to stop the tape, the steps of releasing the tape from said first capstan by discontinuing the suction energization of said first capstan; and momentarily engaging another portion of the back surface of the tape with said second capstan by suction energization of said second capstan thereby dynamically braking the tape owing to the contra-rotational directions of the capstans by which the movement of said second capstan at its confronting surface with the tape is opposite to the direction of motion of the tape imparted thereto by said first capstan.

17. In a magnetic tape transport having tape supply and take-up reels capable of operating in forward and reverse directions, pneumatic loop chambers to tension loops of the tape; a first and a second pneumatic capstan for driving the tape in selected directions; means for continuously contra-rotating said capstans; and a pneumatic system having a pressure and a suction source; valve means connecting said sources of the pneumatic system with said first capstan and with said second capstan; control means operatively connected with said valve means, said control means conditioning said valve means in a manner to connect the first capstan with said suction source and to connect the second capstan with said pressure source, for respectively suction-engaging a portion of the tape with the first capstan and pressure-disengaging the tape from the second capstan thereby driving the tape in a forward direction; said control means having electrical means responsive to a stop command signal to condition said valve means in a manner such that said first capstan is disconnected from said suction source thereby releasing the tape from its driven engagement with said first capstan, and to condition said valve means in a manner such that said second capstan is connected with said suction source for a predetermined interval thereby suction-engaging the tape with said second capstan so that said second capstan becomes a dynamic brake for the tape during said interval as the respective confronting surfaces of the tape and the second capstan are being suction-engaged, owing to the opposite directions of motions of said surfaces of the second capstan and the tape and the frictional contact of the tape with said second capstan.

18. The magnetic tape transport of claim 17 and clamp means for the tape; and means responsive to said stop command signal for conditioning said clamp means to clamp the tape.

References Cited by the Examiner

UNITED STATES PATENTS

| | | | |
|---|---|---|---|
| 2,984,398 | 5/1961 | Chalmers | 226—95 |
| 3,093,283 | 6/1963 | Hodges | 226—95 |
| 3,097,778 | 7/1963 | Pendleton | 226—95 |
| 3,132,544 | 5/1964 | Jones | 226—95 X |

M. HENSON WOOD, Jr., *Primary Examiner.*

ROBERT B. REEVES, *Examiner.*

R. A. SCHACHER, *Assistant Examiner.*